2,689,740

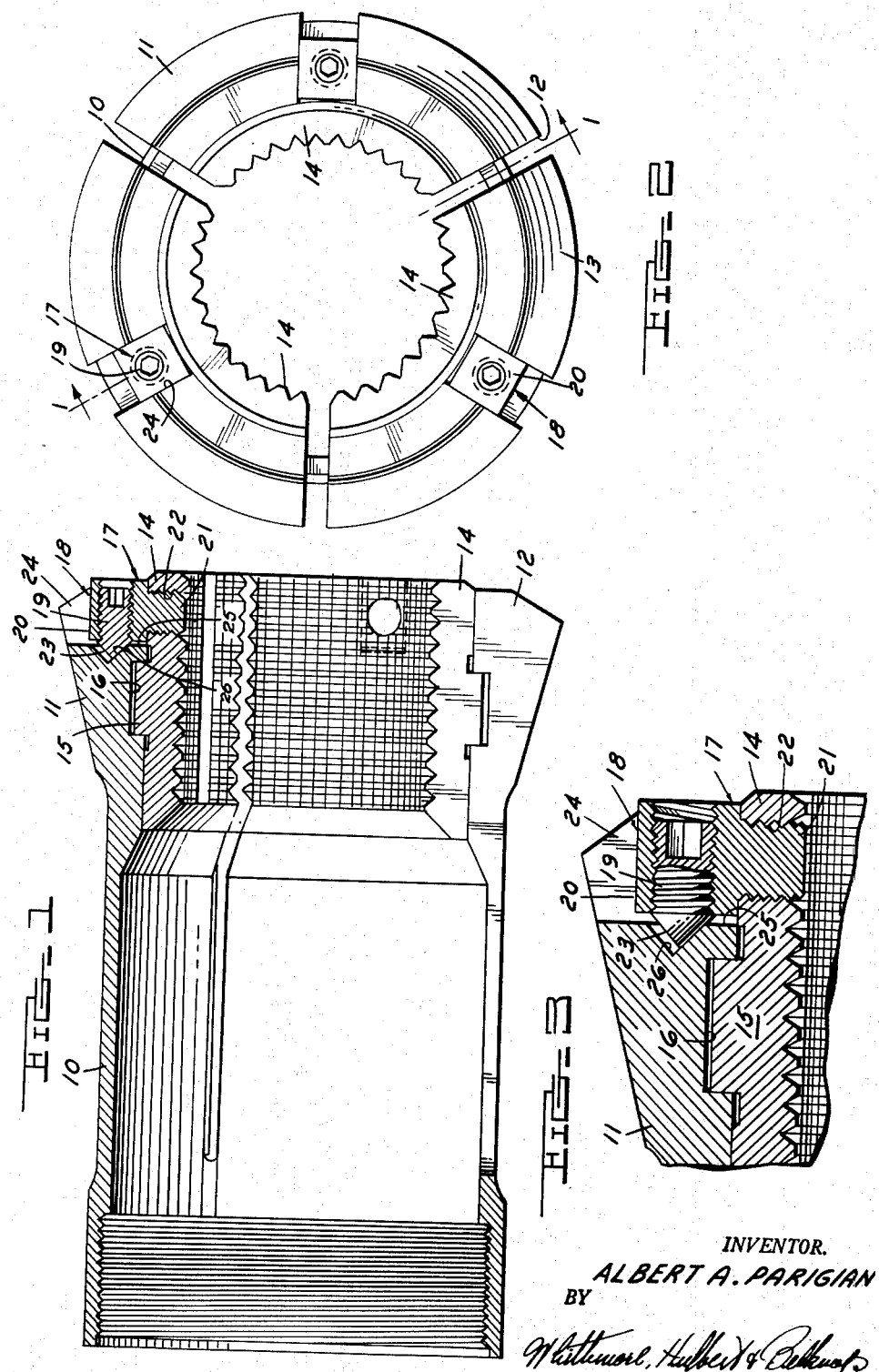
Sept. 21, 1954  A. A. PARIGIAN  2,689,740
COLLET STRUCTURE
Filed March 17, 1952
INVENTOR.
ALBERT A. PARIGIAN
BY
ATTORNEYS Patented Sept. 21, 1954

UNITED STATES PATENT OFFICE 2,689,740

COLLET STRUCTURE

Albert A. Parigian, Allen Park, Mich., assignor to Modern Collet & Machine Co., Ecorse, Mich., a corporation of Michigan Application March 17, 1952, Serial No. 276,946

5 Claims. (Cl. 279—46)

This invention relates to work holding collets of the type having resilient work gripping jaws and pads removably secured to the respective jaws.

It is an object of this invention to provide an improved connection between the stock gripping pads and the respective jaws. The connection forming the subject matter of this invention rigidly holds the pads in place on the respective jaws, and at the same time, permits readily removing the pads from the jaws through the front end of the collet.

It is another object of this invention to provide a collet wherein the quickly removable pads are positively held in place by fastening means carried by the respective pads and accessible for manipulation from the front face of the collet.

It is a further object of this invention to provide a collet of the above general type wherein accidental disengagement of the pads from their respective jaws is prevented even though the connections should work loose for one reason or another.

It is still a further object of this invention to provide a connection possessing the above advantages, and in addition, capable of being inexpensively manufactured, and readily installed on the respective pads.

The foregoing as well as as other objects will be made more apparent as this description proceeds, especially when considered in connection with the accompanying drawing, wherein:

Figure 1 is a longitudinal sectional view through a collet constructed according to my invention and taken on the line 1—1 of Figure 2;

Figure 2 is a front end elevational view of the collet shown in Figure 1; and

Figure 3 is an enlarged fragmentary sectional view through the connection between one pad and its associated jaw.

The collet selected for the purpose of illustration comprises a tubular cylindrical body 10 having a head 11 at the front end and internally threaded at the rear end for attachment to the usual draw tube, not shown. The tubular body 10 has slots 12 spaced equal distances from each other circumferentially of the body and extending axially from the front face of the head 11 on the body. As shown particularly in Figure 2 of the drawing, the slots 12 provide the collet with resilient gripping jaws 13, and it will be noted from Figure 1 that the outer surface of the head 11 is tapered inwardly from the front face of the head for cooperation with the usual machine spindle (not shown) to urge the jaws radially inwardly with respect to the tubular body 10.

The jaws 13 are each provided with a pad 14 removably attached to the inner surface of the adjacent jaws at the front of the collet in positions such that the pads coact with each other to grip the stock extending through the collet. The outer surfaces of the stock gripping pads 14 are provided with circumferentially aligned arcuate ribs 15 intermediate the ends thereof, and the adjacent jaws 13 are formed with circumferentially extending arcuate recesses 16 for respectively receiving the ribs 15. Hence the pads 14 are axially located with respect to the adjacent jaws 13 and are held against axial displacement relative to the jaws. If desired the inner surface of each pad may be knurled or otherwise formed to provide an effective gripping action on the stock during working of the latter.

The pads 14 are readily removably attached to their respecitve jaws 13 so that the pads may be interchanged with pads of different dimension in order to enable the collet to accommodate stock of varying sizes, or to permit readily replacing pads which have become worn during use. In this connection it is pointed out that since the pads 14 are separate from the jaws 13, these pads may be formed of a material having higher wear resisting characteristics than the body 10 of the collet.

Each pad 14 is removably secured to its associated jaw 13 by fastening means 17 carried by the pad and forming a unit with the latter. The fastening means 17 for each pad 14 comprises a lug 18 and a set screw 19. Each lug 18 has a head 20 and a threaded stem 21 projecting radially inwardly from the head 20. The stems 21 respectively threadably engage in openings 22 formed in the pads 14 adjacent the front ends of the latter and substantially midway between opposite side edges thereof. The heads 20 of the lugs 18 are each formed with an internally threaded bore which extends through the heads 20 axially of the tubular body 10 of the collet and is dimensioned to threadably receive the set screw 19. The rear end of each set screw has a conically shaped portion 23, and the front end of each set screw is formed with a polygonally shaped socket for receiving a suitable tool, which may be engaged in the socket by inserting the same into the bore of the lug from the front face thereof.

Each jaw 13 of the collet has a slot 24, which extends axially rearwardly from the front face of the collet and has a depth equal to the thickness of the jaw. In other words the slots 24 in the respective jaws 13 open through the outer surface of the jaws, and also communicate with the interior of the hollow body 10. As shown in Figure 2 of the drawing, the slots 24 are positioned to respectively receive the heads 20 on the lugs 18, and the opposite sides of the heads 20 respectively engage opposite side walls of the slots 24 to prevent rotative movement of the pads 14 relative to the collet body 10.

The rear walls 25 of the slots 24 are formed with conical recesses 26 positioned to respectively receive the conically shaped ends 23 of the set screws 19. The arrangement is such that the conically shaped ends 23 on the set screws have a camming engagement with the inner walls of the respective conically shaped recesses 26 and coact with the latter to move the pads 14 radially outwardly into intimate contact with the inner surfaces of the jaws, and to also urge the ribs 15 on the respective pads 14 into firm engagement with the rear walls of the arcuate recesses 16 in the jaws 13. As a result the pads 14 are positively rigidly secured to their respective jaws 13, and are held in place even though the studs 19 should work loose for one reason or another. In this connection it will be noted from Figure 1 of the drawings that the set screws 19 must be withdrawn a distance approximating the depth of the recesses 26 before the conical portions 23 of the screws are released from engagement with the radially inner walls of the recesses 26. It will further be noted from Figure 1 of the drawings that the studs are accessible for manipulation from the front face of the collet, and that the pads may also be interchanged from the front face of the collet.

What I claim as my invention is:

1. A work holding collet comprising a hollow tubular body adapted to receive a work piece and having resilient jaws at the front end for gripping a work piece, removable pads respectively engageable with the inner faces of the jaws and having radially outwardly extending parts engageable in recesses formed in the inner faces of the respective jaws, each jaw having a slot extending axially rearwardly from the front face and also extending radially inwardly in communication with the interior of the hollow body, lugs removably secured to the respective pads adjacent the front ends of said pads and extending radially outwardly into the slots in adjacent jaws, said lugs having internally threaded bores extending axially rearwardly from the front faces thereof, and members respectively threadably engageable in said bores and having portions at the rear ends positioned for camming engagement with coacting portions on the rear walls of the slots to clamp the pads against the inner faces of the respective segments and to clamp said parts on the respective pads into engagement with the front walls of the recesses in the respective jaws.

2. A work holding collet comprising a hollow tubular body adapted to receive a workpiece and having resilient jaws at the front end for gripping a workpiece, removable pads respectively positioned at the radially inner sides of the jaws and having circumferentially extending ribs projecting radially outwardly from the outer surfaces of the pads into recesses formed in the inner surfaces of the respective jaws, each jaw having a slot intermediate the circumferentially spaced ends thereof, said slots extending axially rearwardly of the tubular body from the front faces of the jaws and also extending radially inwardly in communication with the interior of the hollow body, lugs on the respective pads extending radially outwardly into the slots in adjacent jaws with the opposite sides of the lugs bearing against the adjacent side walls of the slots and having bores extending rearwardly from the sides thereof facing the front ends of the jaws, and members respectively threadably mounted in said bores and having portions at the rear ends thereof coacting with the adjacent rear walls of the slots to clamp said ribs into engagement with the front walls of the recesses in the respective jaws.

3. The work holding collet defined in claim 2 wherein the rear walls of the slots have recesses positioned to respectively receive the rear ends of said members and wherein the rear ends of the members and adjacent walls of the recesses are shaped to draw the pads radially outwardly against the respective jaws upon movement of the members rearwardly relative to the lugs.

4. A work holding collet comprising a hollow tubular body adapted to receive a workpiece and having resilient jaws at the front end for gripping a workpiece, each jaw having a slot intermediate the circumferentially spaced ends of the jaw, said slots extending axially rearwardly of the tubular body from the front walls of the jaws and also extending radially inwardly in communication with the interior of the hollow body, removable pads respectively positioned at the inner sides of the jaws and having radially outwardly projecting lugs positioned to respectively extend into the slots in said jaws with the opposite sides of the lugs bearing against the adjacent walls of the slots, said lugs having threaded bores extending rearwardly from the front walls thereof, and members respectively threadably engageable in said bores and having portions at the rear ends coacting with surfaces on the rear walls of the slots to draw the pads radially outwardly into clamping engagement with the respective jaws.

5. The work holding collet defined in claim 4 wherein the lugs have radially inwardly projecting studs respectively removably threaded into radially extending bores in said pads.

References Cited in the file of this patent

UNITED STATES PATENTS

| Number | Name | Date |
| --- | --- | --- |
| 2,155,019 | Martin | Apr. 18, 1939 |
| 2,161,939 | Sutton | June 13, 1939 |
| 2,219,008 | Drissner | Oct. 22, 1940 |
| 2,228,337 | Balas | Jan. 14, 1941 |
| 2,548,978 | Jelinek | Apr. 17, 1951 |
| 2,551,077 | Wilson | May 1, 1951 |